US012738209B2

(12) United States Patent
Lee et al.

(10) Patent No.: US 12,738,209 B2
(45) Date of Patent: Sep. 15, 2026

(54) ELECTRONIC DEVICE

(71) Applicant: Samsung Display Co., Ltd., Yongin-si (KR)

(72) Inventors: Sehyun Lee, Yongin-si (KR); Kwihyun Kim, Yongin-si (KR); Sunhwa Lee, Yongin-si (KR); Kyunghoon Chung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/299,546

(22) Filed: Aug. 14, 2025

(65) Prior Publication Data

US 2026/0128001 A1 May 7, 2026

(30) Foreign Application Priority Data

Nov. 4, 2024 (KR) ........................ 10-2024-0154001

(51) Int. Cl.
*G09G 3/32* (2016.01)

(52) U.S. Cl.
CPC ........... *G09G 3/32* (2013.01); *G09G 2310/08* (2013.01); *G09G 2320/064* (2013.01); *G09G 2330/022* (2013.01)

(58) Field of Classification Search
CPC ................. G09G 3/32; G09G 2310/08; G09G 2320/064; G09G 2330/022
See application file for complete search history.

(56) References Cited

U.S. PATENT DOCUMENTS 7,629,965 B2 * 12/2009 Han ........................ H04M 1/22 455/158.5
8,115,705 B2 * 2/2012 Kawabe ............... G09G 3/3291 345/82
8,248,333 B2 8/2012 Nakamura et al.
11,282,454 B2 3/2022 Yu et al.
12,578,470 B1 * 3/2026 Varshney ................ G01S 17/88
2002/0047556 A1 * 4/2002 Tajika ................ H05B 41/3927 315/169.3

(Continued)

FOREIGN PATENT DOCUMENTS

JP 5346520 11/2013
KR 10-2021-0056758 5/2021
KR 10-2022-0052265 4/2022

*Primary Examiner* — Ricardo Osorio

(74) *Attorney, Agent, or Firm* — Womble Bond Dickinson (US) LLP

(57) ABSTRACT

An electronic device includes a signal controller and a light emitting control circuit. A plurality of clock signals include a first clock signal having a first frequency and a second clock signal having a second frequency lower than the first frequency. The signal controller outputs the first clock signal in a first mode, and the light emitting control circuit outputs a first light emitting control signal having a first turn-on duration in the first mode. The signal controller outputs the second clock signal in a second mode, and the light emitting control circuit outputs a second light emitting control signal having a second turn-on duration in the second mode. The first turn-on duration has a pulse width equal to a period of the first clock signal, and the second turn-on duration has a pulse width equal to a period of the second clock signal.

20 Claims, 12 Drawing Sheets

(56) References Cited

U.S. PATENT DOCUMENTS

| | | | | |
|---|---|---|---|---|
| 2005/0110720 | A1* | 5/2005 | Akimoto | G09G 3/3258<br>345/76 |
| 2014/0139459 | A1* | 5/2014 | Wu | G06F 3/0445<br>345/173 |
| 2018/0336957 | A1* | 11/2018 | Mi | G09G 3/20 |
| 2021/0356785 | A1* | 11/2021 | Yuan | G09G 3/3685 |
| 2023/0053795 | A1* | 2/2023 | Yeh | G11C 7/12 |
| 2023/0206827 | A1 | 6/2023 | Kim et al. | |
| 2023/0367419 | A1* | 11/2023 | Seo | G06F 3/0412 |
| 2025/0273134 | A1* | 8/2025 | Xie | G11C 19/28 |
| 2025/0356802 | A1* | 11/2025 | Wang | G09G 3/3233 |

* cited by examiner

ELECTRONIC DEVICE

CROSS-REFERENCE TO RELATED APPLICATION(S)

This application claims priority to and the benefits of Korean Patent Application No. 10-2024-0154001 under 35 U.S.C. § 119, filed Nov. 4, 2024, in the Korean Intellectual Property Office, the entire contents of which are incorporated herein by reference.

BACKGROUND

Embodiments described herein relate to an electronic device with reduced power consumption and improved display quality.

Multimedia electronic devices, such as a smart watch, a television, a cellular phone, a tablet computer, a navigation system, and a game console, include a display device that displays an image. The display device includes a display panel and a panel driving circuit. The panel driving circuit includes a data control circuit to provide a data voltage to data lines, a gate control circuit to provide a gate signal to gate lines, and a light emitting control circuit to provide a light emitting control signal to light emitting control lines.

SUMMARY

Embodiments provide an electronic device reduced in power consumption, and improved in display quality.

According to an embodiment, an electronic device may include a display panel that displays an image and including a pixel including a light emitting element and a pixel circuit electrically connected to the light emitting element, a signal controller that determines an operating mode of the display panel, and outputs a plurality of clock signals, and a light emitting control circuit to receive the plurality of clock signals and output a light emitting control signal having a turn-on duration for controlling transmission of a current provided to the light emitting element. The operating mode may include a first mode driven in a first brightness range and a second mode driven in a second brightness range wider than the first brightness range, and the plurality of clock signals may include a first clock signal having a first frequency and a second clock signal having a second frequency lower than the first frequency. The signal controller may output the first clock signal in the first mode, and the light emitting control circuit may output a first light emitting control signal having a first turn-on duration in the first mode. The signal controller may output the second clock signal in the second mode, and the light emitting control circuit may output a second light emitting control signal having a second turn-on duration in the second mode. A pulse width of the first turn-on duration may be substantially equal to a period of the first clock signal, and a pulse width of the second turn-on duration may be substantially equal to a period of the second clock signal.

According to an embodiment, a maximum brightness of the second brightness range may be at least 100 times of a maximum brightness of the first brightness range.

According to an embodiment, a maximum brightness of the first brightness range may be about 5 nits, a maximum brightness of the second brightness range may be about 600 nits.

According to an embodiment, a duty ratio of the second turn-on duration may be at least four times a duty ratio of the first turn-on duration.

According to an embodiment, the plurality of clock signals may include a first color clock signal having a first color frequency, a second color clock signal having a second color frequency, and a third color clock signal having a third color frequency, and the first color frequency, the second color frequency, and the third color frequency may be different from each other. The signal controller may output the first color clock signal, the second color clock signal, and the third color clock signal, in the first mode and the second color frequency may be higher than the first color frequency, and the third color frequency may be higher than the second color frequency.

According to an embodiment, the light emitting control circuit may output a first color light emitting control signal by receiving the first color clock signal, output a second color light emitting control signal by receiving the second color clock signal, and output a third color light emitting control signal by receiving the third color clock signal.

According to an embodiment, the pixel may be provided in plurality, and the plurality of pixels may include a red pixel, a green pixel, and a blue pixel. The red pixel may receive the first color light emitting control signal, the green pixel may receive the second color light emitting control signal, and the blue pixel may receive the third color light emitting control signal.

According to an embodiment, the first color light emitting control signal, the second color light emitting control signal, and the third color light emitting control signal may be substantially equal to each other, in the second mode.

According to an embodiment, the signal controller may further output a third clock signal having a third frequency between the first frequency and the second frequency, the operating mode further may include a third mode driven in a third brightness range, and the signal controller may output the third clock signal in the third mode, and the light emitting control circuit may output a third light emitting control signal having a third turn-on duration.

According to an embodiment, a maximum brightness of the first brightness range may be about 5 nits, a maximum brightness of the second brightness range may be about 600 nits and a maximum brightness of the third brightness range may be about 126 nits.

According to an embodiment, a duty ratio of the third turn-on duration may be greater than a duty ratio of the first turn-on duration.

According to an embodiment, the first mode may be an Always on display (AOD) mode.

According to an embodiment, the light emitting element may be a micro-light emitting diode.

According to an embodiment, a housing accommodating the display panel included in the housing and a strap coupled to the housing may be further included.

According to an embodiment, an electronic device may include a display panel including a pixel including a light emitting element, a signal controller that selectively drives the display panel in a first mode or a second mode different from the first mode, and outputs a first clock signal having a first frequency and a second clock signal having a second frequency lower than the first frequency, a light emitting stage that receives one of the first clock signal and the second clock signal, and outputs a light emitting control signal having a turn-on duration for controlling transmission of a current provided to the light emitting element, a housing accommodating the display panel included in the housing, and a strap coupled to the housing. The signal controller may output the first clock signal in the first mode, and the light emitting stage may output a first light emitting control signal having a first turn-on duration. The signal controller may output the second clock signal in the second mode, and the light emitting stage may output a second light emitting control signal having a second turn-on duration. The first turn-on duration may have a pulse width equal to a period of the first clock signal, and the second turn-on duration may have a pulse width equal to a period of the second clock signal.

According to an embodiment, a maximum brightness of the second brightness range may be at least 100 times of a maximum brightness of the first brightness range, and a duty ratio of the second turn-on duration may be at least four times a duty ratio of the first turn-on duration.

According to an embodiment, the plurality of clock signals may include a first color clock signal having a first color frequency, a second color clock signal having a second color frequency, and a third color clock signal having a third color frequency, and the first color frequency, the second color frequency, and the third color frequency may be different from each other. The signal controller may output the first color clock signal, the second color clock signal, and the third color clock signal, in the first mode and the second color frequency may be higher than the first color frequency, and the third color frequency may be higher than the second color frequency.

According to an embodiment, the pixel may include a plurality of pixels, and the plurality of pixels may include a red pixel, a green pixel, and a blue pixel. The light emitting stage may output a first color light emitting control signal to the red pixel by receiving the first color clock signal, output a second color light emitting control signal to the green pixel by receiving the second color clock signal, and output a third color light emitting control signal to the blue pixel by receiving the third color clock signal.

According to an embodiment, the first color light emitting control signal, the second color light emitting control signal, and the third color light emitting control signal may be substantially equal to each other, in the second mode.

According to an embodiment, the light emitting element may be a micro-light emitting diode.

BRIEF DESCRIPTION OF THE DRAWINGS

The above and other objects and features of the disclosure will become apparent by describing in detail embodiments thereof with reference to the accompanying drawings.

DETAILED DESCRIPTION OF THE EMBODIMENTS

Figure 1:
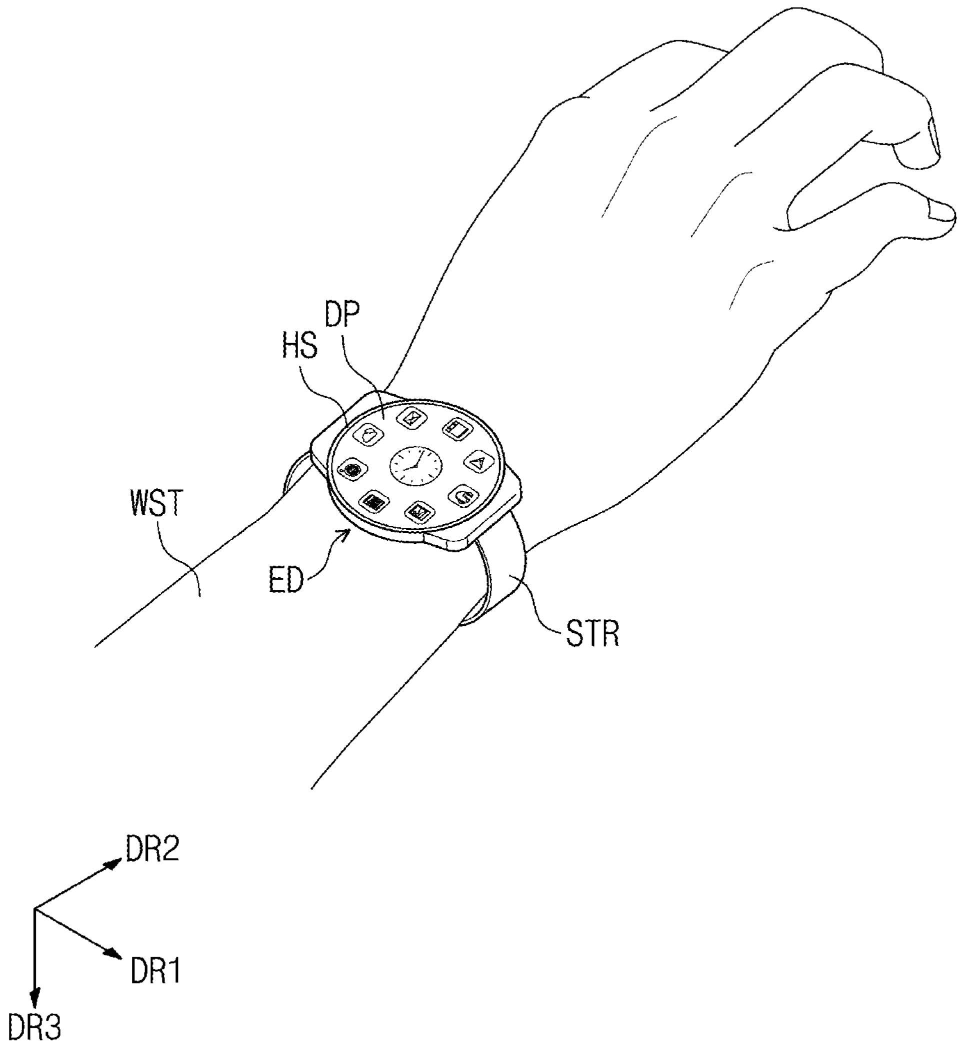
FIG. 1 is a schematic perspective view of an electronic device according to an embodiment.

In the following description, for the purposes of explanation, numerous specific details are set forth in order to provide a thorough understanding of various embodiments or implementations of the invention. As used herein, "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the scope of the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element or a layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the axis of the first direction DR1, the axis of the second direction DR2, and the axis of the third direction DR3 are not limited to three axes of a rectangular coordinate system, such as the X, Y, and Z-axes, and may be interpreted in a broader sense. For example, the axis of the first direction DR1, the axis of the second direction DR2, and the axis of the third direction DR3 may be perpendicular to one another, or may represent different directions that are not perpendicular to one another. For the purposes of this disclosure, "at least one of A and B" may be understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art. For example, "about" may mean within one or more standard deviations, or within ±20%, ±10%, or ±5% of the stated value.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

The terms "part" and "unit" refer to a software component or a hardware component to perform a specific function. The hardware component may include field-programmable gate array (FPGA) or an application-specific integrated circuit (ASIC). The software component may refer to an executable code and/or data used by the executable code in an addressable storage medium. Accordingly, software components may be, for example, object-oriented software components, class components, and task components, and may include processes, functions, properties, procedures, subroutines, program code segments, driver data, firmware, microcodes, circuits, data, database, data structures, tables, arrangements or variables.

Unless defined otherwise, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments will be described with reference to drawings.

Figure 2:
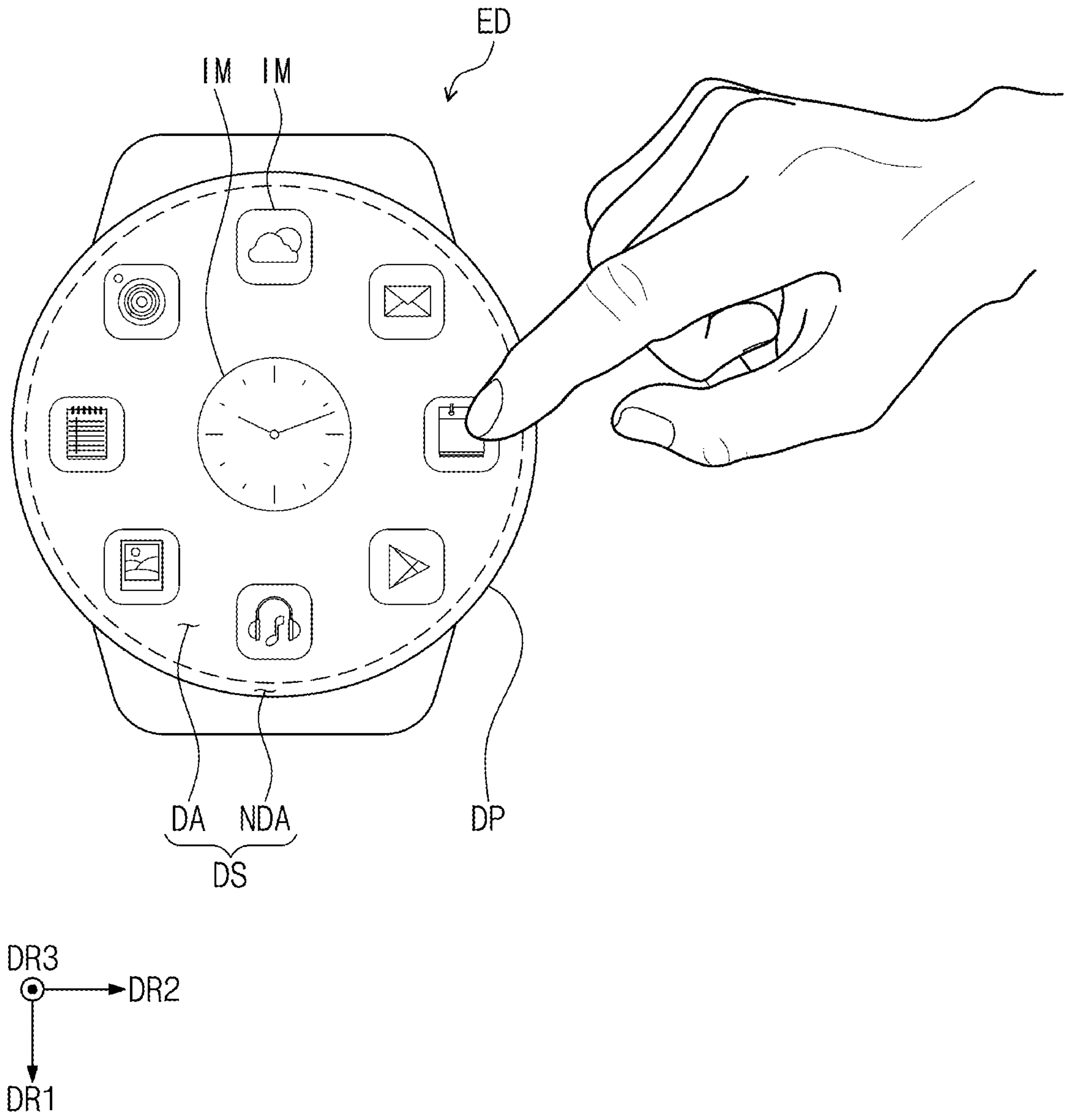
FIG. 2 is a schematic plan view of an electronic device according to an embodiment.

FIG. 1 is a schematic perspective view illustrating an electronic device ED according to an embodiment. FIG. 2 is a schematic plan view of the electronic device ED according to an embodiment.

Referring to FIGS. 1 and 2, the electronic device ED may include a display panel DP, a housing HS that includes the display panel DP, and a strap STR coupled to the housing HS.

According to an embodiment, a user may use the electronic device ED in the state that the user wears the electronic device ED on a wrist WST of the user. The user may place the strap STR, which is coupled to the housing HS that includes the display panel DP, around the wrist WST of the user such that the strap STR may surround the wrist WST. For example, the user may place a display surface DS of the display panel DP to face the user.

The electronic device ED may be a device, which is activated, in response to an electrical signal. Although FIG. 1 illustrates that the electronic device ED is a smart watch including the housing HS and the strap STR, the disclosure is not limited thereto. For example, the electronic device ED may be applied to a television, a monitor, an external billboard, a tablet PC, a vehicle navigation unit, a personal computer, a laptop computer, a personal digital terminal, a game console, a smartphone, a camera, or a wearable device. The wearable device may include a virtual reality device, an augmented reality device, and a smart watch. The virtual reality device and the augmented reality device may be devices in the form of glasses wearable by the user. The above devices are examples, and the electronic device ED may be applied to another device without departing from the scope of the disclosure.

The display panel DP may display an image IM. The display panel DP may provide various images IM to the user. The image IM may show the time and various applications. For example, the display panel DP may display an hour hand and a minute hand indicating the time, which is to be provided for the user. For example, the display panel DP may display various applications to be provided for the user.

The electronic device ED may be a touch-type device. For example, in case that the user touches applications displayed on the display panel DP, the touched applications may be executed. For example, weather information may be provided for the user in case that an application for weather is touched among the applications displayed on the display panel DP.

A top surface (or upper surface) of the display panel DP may be defined as the display surface DS, and may have a plane defined by a first direction DR1 and a second direction DR2. The first direction DR1 and the second direction DR2 may be defined as directions intersecting each other. The images IM generated from the electronic device ED may be provided for the user through the display surface DS.

Hereinafter, a direction substantially perpendicular to a plane defined by the first direction DR1 and the second direction DR2 is defined as a third direction DR3. Also, in the description, the expression "when viewed in a plan view" or "in plan view" refers to a state of being viewed in the third direction DR3.

The display surface DS may include a display region DA and a non-display region NDA around the display region DA. The display region DA may display an image, and the non-display region NDA may not display an image. The non-display region NDA may surround the display region DA.

The electronic device ED may have a circle shape when viewed in a plan view, but the disclosure is not limited thereto. For example, the electronic device ED may have various shapes such as a rectangular shape, a polygonal shape, or an oval shape.

Figure 3:
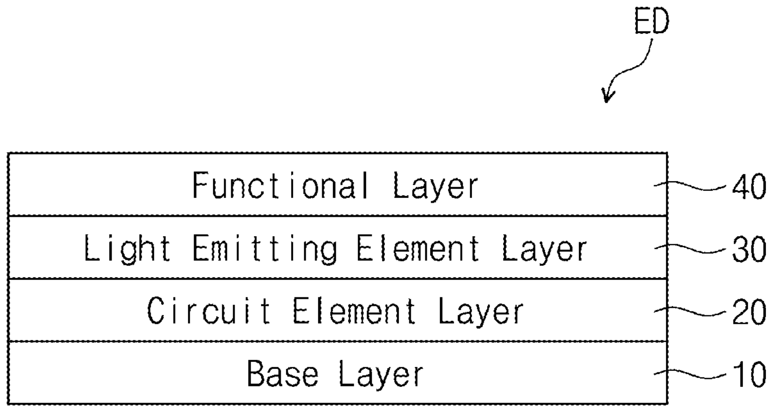
FIG. 3 is a schematic cross-sectional view schematically illustrating an electronic device according to an embodiment.

FIG. 3 is a schematic cross-sectional view schematically illustrating the electronic device ED according to an embodiment.

Referring to FIG. 3, the electronic device ED may include a base layer 10, a circuit element layer 20, and a light emitting element layer 30. The electronic device ED may further include a functional layer 40 disposed on the light emitting element layer 30.

The base layer 10 may include a silicon substrate. The circuit element layer 20 may be disposed on the base layer 10 and may include a pixel circuit. The pixel circuit may control the operation of a light emitting element EE (see FIG. 5) in the light emitting element layer 30 to be described later. The pixel circuit may include at least one transistor.

The light emitting element layer 30 may include the light emitting element EE (see FIG. 5) electrically connected to the pixel circuit. The light emitting element EE (see FIG. 5) may be an electrically driven light emitting diode, which is a kind of a compound semiconductor, including a main semiconductor material such as gallium (Ga), phosphorus (P), and arsenic (As). In case that a forward current is applied to a p-n junction structure, an electron and a hole may be combined with each other on an interface to generate a light having a specific wavelength corresponding to band gap energy. The details of the light emitting element EE (see FIG. 5) will be described later in more detail.

The functional layer 40 may include an anti-reflective layer. The anti-reflective layer may reduce reflectance of external light incident from the outside. According to an embodiment, the anti-reflective layer may include a color filter. In another example, the anti-reflective layer may include a retarder and a polarizer.

Figure 4:
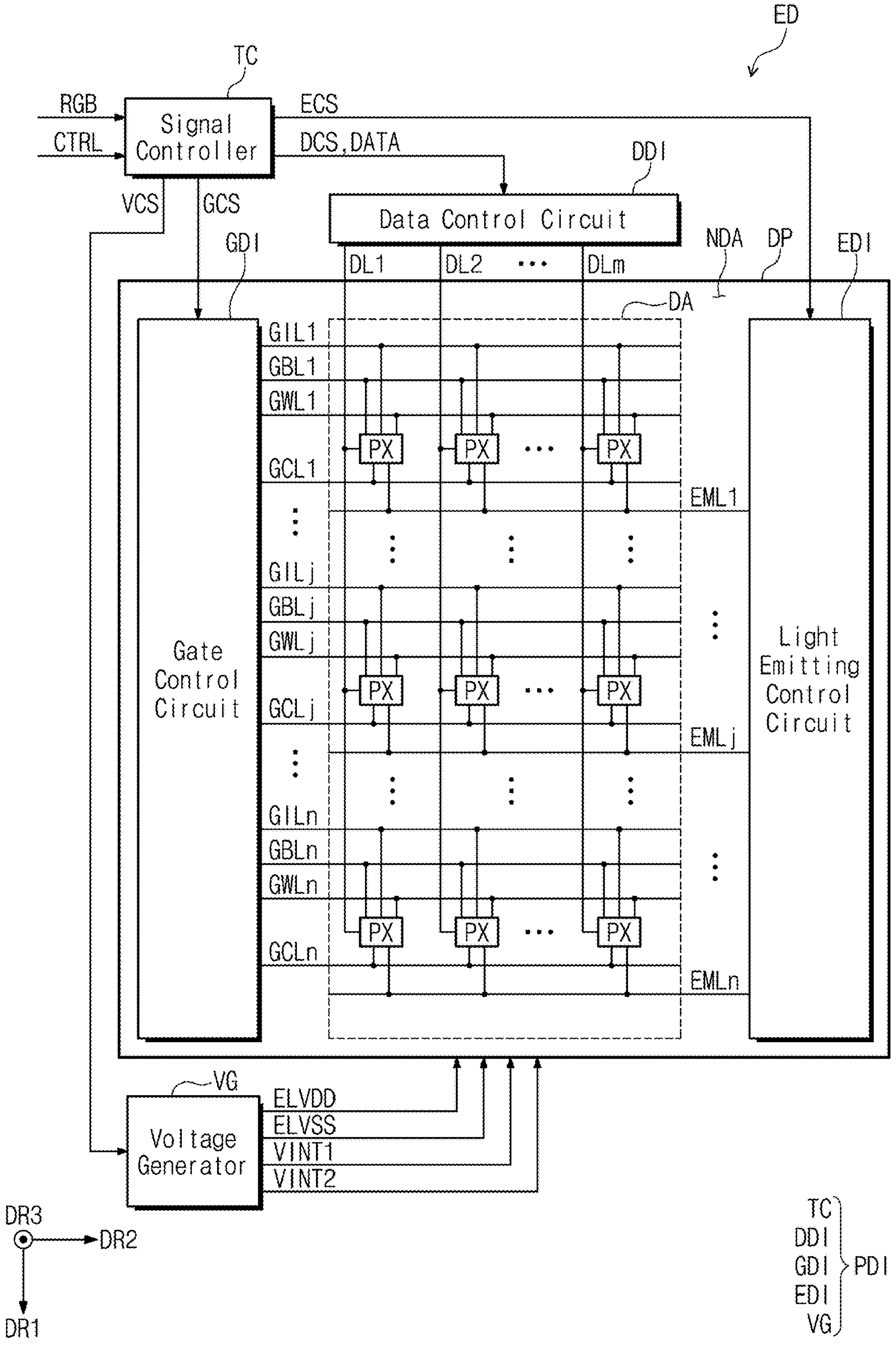
FIG. 4 is a schematic block diagram of an electronic device according to an embodiment.

FIG. 4 is a block diagram of the electronic device ED according to an embodiment.

Referring to FIG. 4, the electronic device ED may include the display panel DP and a panel driving circuit PDI to drive the display panel DP. The panel driving circuit PDI may include a signal controller TC, a data control circuit DDI, a gate control circuit GDI, a light emitting control circuit EDI, and a voltage generator VG.

The signal controller TC may receive an image signal RGB and a control signal CTRL from the outside. The signal controller TC may generate an image data signal DATA by converting a data format of the image signal RGB to be compatible with the interface specification of the data control circuit DDI. The signal controller TC may output a first control signal DCS, a second control signal GCS, a third control signal ECS, and a fourth control signal VCS.

The data control circuit DDI may receive the first control signal DCS and the image data signal DATA from the signal controller TC. The data control circuit DDI may convert the image data signal DATA into data signals and output the data signals to data lines DL1 to DLm. The data signals may be analog voltages corresponding to grayscale values of the image data signal DATA. The data lines DL1 to DLm may be arranged in the second direction DR2, and each of the data lines DL1 to DLm may extend in the first direction DR1.

The gate control circuit GDI and the light emitting control circuit EDI may be disposed in the non-display region NDA of the display panel DP, but the disclosure is not particularly limited thereto. For example, at least a portion of the gate control circuit GDI and the light emitting control circuit EDI may be disposed in the display region DA. The gate control circuit GDI and the light emitting control circuit EDI may include transistors formed through the same process as that used for the pixel circuit PXC (see FIG. 5).

The gate control circuit GDI may be electrically connected to initializing gate lines GIL1 to GILn, write gate lines GWL1 to GWLn, black gate lines GBL1 to GBLn, and compensating gate lines GCL1 to GCLn. The gate control circuit GDI may receive the second control signal GCS and output gate signals to the initializing gate lines GIL1 to GILn, the write gate lines GWL1 to GWLn, the black gate lines GBL1 to GBLn, and the compensating gate lines GCL1 to GCLn.

The light emitting control circuit EDI may be electrically connected to the light emitting control lines EML1 to EMLn. The light emitting control circuit EDI may receive the third control signal ECS and output the light emitting control signal to the light emitting control lines EML1 to EMLn.

The gate control circuit GDI and the light emitting control circuit EDI may be spaced apart from each other, and the display region DA may be disposed between the gate control circuit GDI and the light emitting control circuit EDI. However, this is provided only for the illustrative purpose. For example, the gate control circuit GDI and the light emitting control circuit EDI may be disposed at the same side of the display region DA. In another example, at least a portion of the gate control circuit GDI and the light emitting control circuit EDI may overlap the display region DA.

The initializing gate lines GIL1 to GILn, the write gate lines GWL1 to GWLn, the black gate lines GBL1 to GBLn, the compensating gate lines GCL1 to GCLn, and the light emitting control lines EML1 to EMLn may extend in the second direction DR2.

The display panel DP may include pixels PX disposed in the display region DA. The pixels PX may be repeatedly arranged in the first direction DR1 and the second direction DR2 intersecting the first direction DR1.

Figure 5:
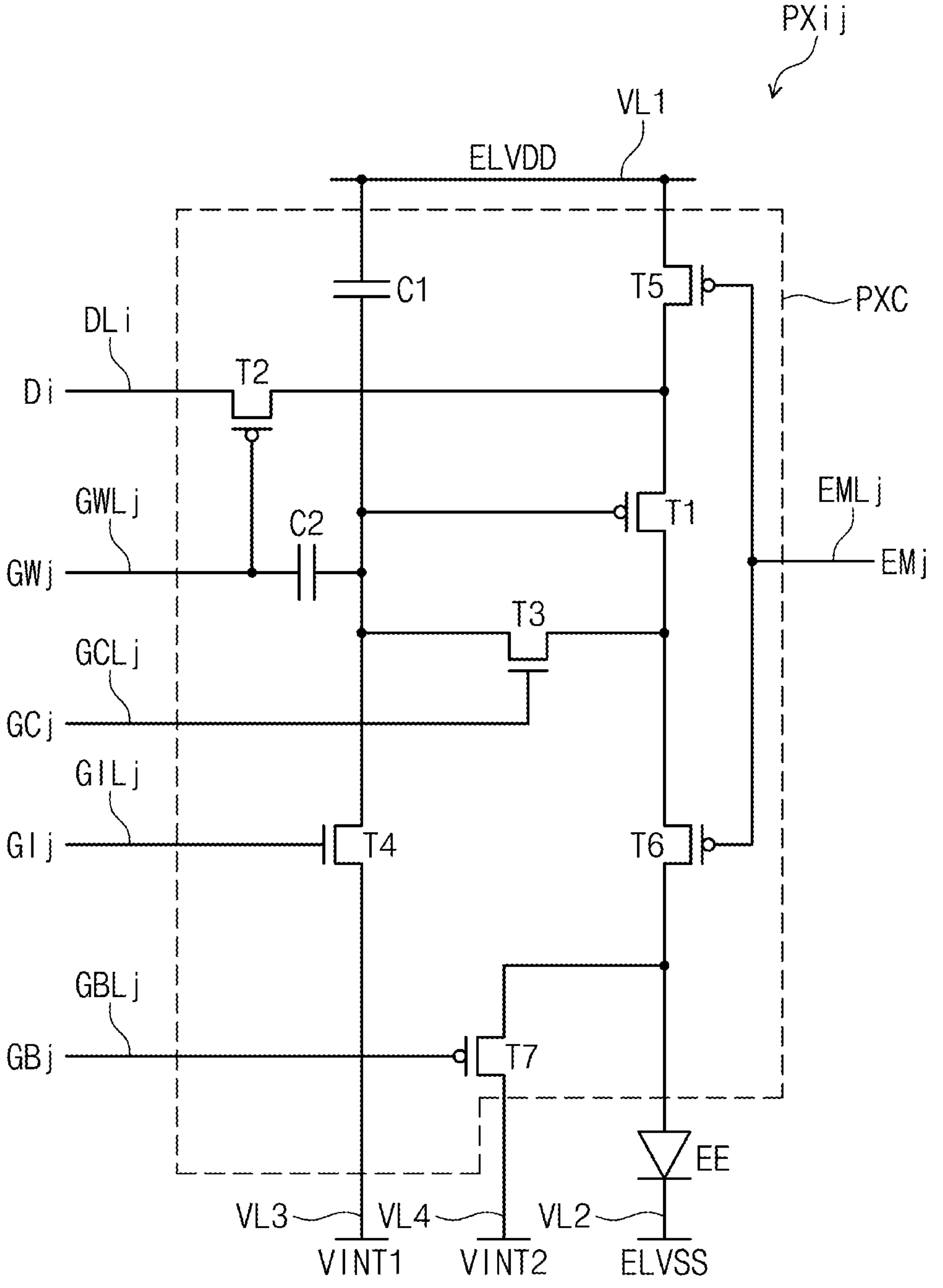
FIG. 5 is a schematic diagram of an equivalent circuit of a pixel according to an embodiment.

Each of the pixels PX may include the light emitting element EE (see FIG. 5) and the pixel circuit PXC (see FIG. 5) to control a light emitted from the light emitting element EE (see FIG. 5). The pixel circuit PXC (see FIG. 5) may include at least one transistor and at least one capacitor.

Each of the pixels PX may be electrically connected to four gate lines, one light emitting control line, and one data line. For example, as illustrated in FIG. 4, the pixels arranged in a first row may be connected to first gate lines GIL1, GWL1, GBL1, and GCL1 and a first light emitting control line EML1. The pixels in a first column may be connected to the first data line DL1. For example, the pixels provided in a j-th row may be connected to j-th gate lines GILj, GWLj, GBLj, and GCLj and the j-th light emitting control line EMLj.

According to an embodiment, the display panel DP may be selectively driven in operating modes. Accordingly, the signal controller TC may determine the operating modes of the display panel DP. The signal controller TC may determine the operating modes of the display panel DP, and may output the control signals DCS, GCS, ECS, and VCS, which correspond to the operating modes, to respective control circuits DDI, GDI, EDI, and VG. For example, the signal controller TC may determine an operating mode of the display panel DP, and may output the third control signal ECS, which corresponds to the operating mode, to the light emitting control circuit EDI.

The voltage generator VG may generate voltages necessary for an operation of the display panel DP. According to an embodiment, the voltage generator VG may generate a first driving voltage ELVDD, a second driving voltage ELVSS, a first initializing voltage VINT1, and a second initializing voltage VINT2.

FIG. 5 is a schematic diagram of an equivalent circuit of a pixel PXij according to an embodiment.

FIG. 5 illustrates an equivalent circuit of the pixel PXij connected to the i-th data line DLi, the j-th initializing gate line GILj, the j-th black gate line GBLj, the j-th write gate line GWLj, the j-th compensating gate line GCLj, and the j-th light emitting control line EMLj. Each of the pixels PX illustrated in FIG. 4 may have the same configuration as a configuration of the pixel PXij illustrated in FIG. 5.

According to an embodiment, the pixel PXij may include the light emitting element EE and the pixel circuit PXC electrically connected to the light emitting element EE. The pixel circuit PXC may include first, second, third, fourth, fifth, sixth, and seventh transistors T1, T2, T3, T4, T5, T6, and T7, a first capacitor C1, and a second capacitor C2.

The third and fourth transistors T3 and T4 among the first, second, third, fourth, fifth, sixth, and seventh transistors T1, T2, T3, T4, T5, T6, and T7 may be N-type transistors that use an oxide semiconductor as a semiconductor layer. The first, second, fifth, sixth, and seventh transistors T1, T2, T5, T6, and T7 may be P-type transistors having a low-temperature polycrystalline silicon (LTPS) semiconductor layer. However, the disclosure is not limited thereto, and the first to seventh transistors T1 to T7 may be P-type transistors or N-type transistors. According to an embodiment, at least one among the first to seventh transistors T1, T2, T3, T4, T5, T6, and T7 may be an N-type transistor, and the remaining transistors of the first to seventh transistors T1, T2, T3, T4, T5, T6, and T7 may be P-type transistors.

The j-th initializing gate line GILj may transmit an initializing gate signal GIj, the j-th black gate line GBLj may transmit a black gate signal GBj, the j-th write gate line GWLj may transmit a write gate signal GWj, the j-th compensating gate line GCLj may transmit a compensating gate signal GCj, the j-th light emitting control line EMLj may transmit a light emitting control signal EMj, and the i-th data line DLi may transmit a data signal Di. The data signal Di may have a voltage level corresponding to the grayscale value of the image data signal DATA output from the signal controller TC.

For example, the pixel PXij may be connected to first, second, third, and fourth driving voltage lines VL1, VL2, VL3, and VL4. The first driving voltage line VL1 may transmit the first driving voltage ELVDD. The second driving voltage line VL2 may transmit the second driving voltage ELVSS. The third driving voltage line VL3 may transmit the first initializing voltage VINT1 and may be referred to as a first initializing voltage line. The fourth driving voltage line VL4 may transmit the second initializing voltage VINT2 and may be referred to as a second initializing voltage line.

The first transistor T1 may include a first electrode connected to the first driving voltage line VL1 through the fifth transistor T5, a second electrode electrically connected to an anode of the light emitting element EE through the sixth transistor T6, and a gate electrode connected to a first terminal of the first capacitor C1. The first transistor T1 may receive the data signal Di transmitted through the i-th data line DLi according to a switching operation of the second transistor T2 and supply a driving current to the light emitting element EE.

The second transistor T2 may include a first electrode connected to the i-th data line DLi, a second electrode connected to the first electrode of the first transistor T1, and a gate electrode connected to the j-th write gate line GWLj. The second transistor T2 may be turned on in response to the write gate signal GWj received through the j-th write gate line GWLj and may transmit the data signal Di received through the data line DLi to the first electrode of the first transistor T1.

The third transistor T3 may include a first electrode connected to the gate electrode of the first transistor T1, a second electrode connected to the second electrode of the first transistor T1, and a gate electrode connected to the j-th compensating gate line GCLj. The third transistor T3 may be turned on in response to the compensating gate signal GCj transmitted through the j-th compensating gate line GCLj, and connect the gate electrode of the first transistor T1 to the second electrode of the first transistor T1 such that the first transistor T1 may be diode-connected.

The fourth transistor T4 may include a first electrode connected to the gate electrode of the first transistor T1, a second electrode connected to the third driving voltage line VL3 to receive the first initializing voltage VINT1, and a gate electrode connected to the j-th initializing gate line GILj. The fourth transistor T4 may be turned on in response to the j-th initializing gate signal GIj received through the j-th initializing gate line GILj to perform an initializing operation. The initializing operation may transmit the first initializing voltage VINT1 to the gate electrode of the first transistor T1, such that the voltage of the gate electrode of the first transistor T1 may be initialized.

The fifth transistor T5 may include a first electrode connected to the first driving voltage line VL1, a second electrode connected to the first electrode of the first transistor T1, and a gate electrode connected to the j-th light emitting control line EMLj.

The sixth transistor T6 may include a first electrode connected to the second electrode of the first transistor T1, a second electrode connected to an anode of the light emitting element EE, and a gate electrode connected to the j-th light emitting control line EMLj.

The fifth transistor T5 and the sixth transistor T6 may be simultaneously turned on in response to the light emitting control signal EMj received through the j-th light emitting control line EMLj, such that the first driving voltage ELVDD may be compensated through the first transistor T1, which is diode-connected and transmitted to the light emitting element EE. The light emitting control signal EMj may have a turn-on duration for controlling the transmission of a current to be provided to the light emitting element EE. A pulse width of the turn-on duration of the light emitting control signal EMj may be varied according to the operating mode of the display panel DP. For example, the pulse width of the turn-on duration of the light emitting control signal EMj may be varied such that the pulse width of the turn-on duration in the lower brightness mode showing the lower maximum brightness is wider than the pulse width of the turn-on duration in the normal mode showing the higher maximum brightness. Accordingly, a grayscale value range, which is expressed (or displayed) in the lower brightness mode, may be widened. The details thereof will be described later.

The seventh transistor T7 may include a first electrode connected to the anode of the light emitting element EE, a second electrode connected to the fourth driving voltage line VL4, and a gate electrode connected to the j-th black gate line GBLj. The seventh transistor T7 may be turned on in response to the black gate signal GBj received through the j-th black gate line GBLj to bypass a current of the anode of the light emitting element EE to the fourth driving voltage line VL4.

The first terminal of the first capacitor C1 may be connected to the gate electrode of the first transistor T1 described above, and a second terminal of the first capacitor C1 may be connected to the first driving voltage line VL1.

A first terminal of the second capacitor C2 may be connected to the first terminal of the first capacitor C1, and a second terminal of the second capacitor C2 may be connected to the j-th write gate line GWLj.

The anode of the light emitting element EE may be connected to the second electrode of the sixth transistor T6, and the cathode of the light emitting element EE may be connected to the second driving voltage line VL2 to transmit the second driving voltage ELVSS.

According to an embodiment, the light emitting element EE may be an inorganic light emitting element EE fabricated using an inorganic material. The inorganic light emitting element EE may be a micro-light emitting diode having the size of at most about 100 μm (or a maximum of about 100 μm). The size of the micro-light emitting diode may range from a nanometer scale size to a micrometer scale size. For example, the micro-light emitting diode may have a diameter (or width) and/or a length ranging from a nanometer scale size to a micrometer scale size. The micro-light emitting diode may provide performance higher than performance of an organic light emitting diode, in brightness, light emission efficiency, or lifespan.

The circuit configuration of the pixel PXij is not limited to the circuit configuration illustrated in FIG. 5. For example, in the pixel circuit PXC inside the pixel PXij, the number of transistors, the number capacitors, and connection relationship may be variously changed.

Figure 6:
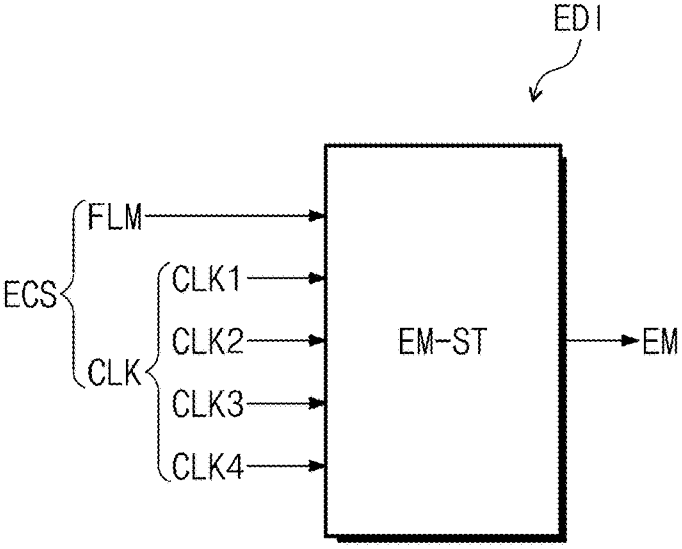
FIG. 6 is a schematic view illustrating one light emitting stage included in a light emitting control circuit according to an embodiment.

FIG. 6 is a schematic view illustrating a light emitting stage (e.g., single light emitting stage) EM-ST included in the light emitting control circuit EDI according to an embodiment.

Referring to FIGS. 4 and 6, the light emitting control circuit EDI may include light emitting stages EM-ST. FIG. 6 illustrates one light emitting stage EM-ST among the light emitting stage EM-ST. One light emitting stage EM-ST may output a light emitting control signal EM to pixels PX, which are arranged in one row, among pixels illustrated in FIG. 4.

According to an embodiment, the light emitting stage EM-ST may receive the third control signal ECS from the signal controller TC. The third control signal ECS may include a frame signal FLM and clock signals CLK. The frame signal FLM may be a signal for indicating the start of one frame of an image displayed on the display panel DP. The clock signals CLK may be timing signals for determining output timing of signals for driving the light emitting control circuit EDI.

According to an embodiment, the clock signals may include a first clock signal CLK1, a second clock signal CLK2, a third clock signal CLK3, and a fourth clock signal CLK4. The first clock signal CLK1, the second clock signal CLK2, the third clock signal CLK3, and the fourth clock signal CLK4 may correspond to operating modes of the display panel DP, and may be different from each other in frequency. The details thereof will be described later.

According to an embodiment, the signal controller TC may output one of the clock signals CLK corresponding to an operating mode determined, to the light emitting stage EM-ST. In case that the signal controller TC outputs one of the clock signals CLK to the light emitting stage EM-ST by determining the operating mode of the display panel DP, the light emitting stage EM-ST may output the light emitting control signal EM to a single pixel PX corresponding to the operating mode determined, based on the operating mode determined.

Figure 7:
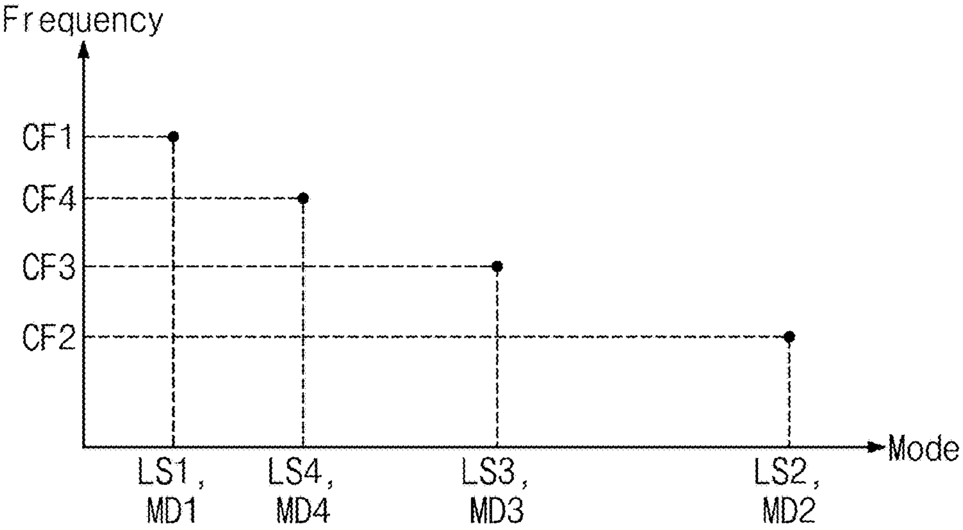
FIG. 7 is a graph illustrating a frequency of each of clock signals according to an embodiment.

FIG. 7 is a graph illustrating a frequency of each of clock signals according to an embodiment. FIG. 7 illustrates frequencies of clock signals CLK (see FIG. 6) corresponding to the operating modes described below.

Referring to FIGS. 4, 6, and 7, the operating modes may include a first mode MD1, a second mode MD2, a third mode MD3, and a fourth mode MD4.

According to an embodiment, the first mode MD1, the second mode MD3, the third mode MD3, and the fourth mode MD4 may be modes driven in mutually different brightness ranges. For example, the first mode MD1 may be a mode driven in the first brightness range LS1, the second mode MD2 may be a mode driven in the second brightness range LS2, the third mode MD3 may be a mode driven in the third brightness range LS3, and the fourth mode MD4 may be a mode driven in the fourth brightness range LS4.

According to an embodiment, the second brightness range LS2 may be wider than the first brightness range LS1. The maximum brightness of the second brightness range LS2 may be at least 100 times of the maximum brightness of the first brightness range LS1. For example, the second brightness range LS2 may range from about 0 nit to about 600 nits, and the first brightness range LS1 may range from about 0 nit to about 5 nits. Accordingly, the maximum brightness of the first brightness range LS1 may be about 5 nits, and the maximum brightness of the second brightness range LS2 may be about 600 nits.

According to an embodiment, the first mode MD1 may be a lower brightness mode showing the maximum brightness of about 5 nits. For example, the first mode MD1 may be a mode appropriate to a situation, such as a movie theater, requiring a low brightness. For example, the first mode MD1 may be an Always on display (AOD) mode for keeping displaying information, such as a date, a time, a state of charge (SOC), and an alert, on a display screen, even though the display screen is turned off.

The second mode MD2 may be a mode showing the maximum brightness of about 600 nits to express a higher brightness than a brightness of the first mode MD1. The second mode MD2 may be referred to as a normal mode usually used by a user.

According to an embodiment, the third brightness range LS3 may be wider than the first brightness range LS1, and narrower than the second brightness range LS2. For example, the third brightness range LS3 may range from about 0 nit to about 126 nits. The fourth brightness range LS4 may be wider than the first brightness range LS1, and narrower than the third brightness range LS3. For example, the fourth brightness range LS4 may range from about 0 nit to about 50 nits. Accordingly, the maximum brightness of the third brightness range LS3 may be about 126 nits, and the maximum brightness of the fourth brightness range LS4 may be about 50 nits.

According to an embodiment, the third mode MD3, which shows the maximum brightness of about 126 nits, may be a mode for expressing a brightness higher than a brightness for the first mode MD1, and lower than a brightness of the second mode MD2. Accordingly, the third mode MD3 may be a mode referred to as an initial setting mode of the electronic device ED. The fourth mode MD4, which shows the maximum brightness of about 50 nits, may be referred to as a lower brightness mode together with the first mode MD1 showing the maximum brightness of about 5 nits.

Although FIG. 7 illustrates four operating modes of the display panel DP, the disclosure is not limited thereto. For example, the display panel DP may be selectively driven in at least five operating modes, or may be selectively driven in at most three operating modes without some of the operating modes illustrated in FIG. 7.

According to an embodiment, the signal controller TC may output the clock signals CLK, which are different from each other in frequency, to the light emitting stage EM-ST, based on the operating mode selected among the above-described operating modes. For example, the signal controller TC may output the first clock signal CLK1 having a first frequency CF1 in the first mode MD1 and output the second clock signal CLK2 having a second frequency CF2 in the second mode MD2. For example, the signal controller TC may output the third clock signal CLK3 having a third frequency CF3 in the third mode MD3, and the fourth clock signal CLK4 having a fourth frequency CF4 in the fourth mode MD4.

According to an embodiment, as illustrated in FIG. 7, the first frequency CF1, the second frequency CF2, the third frequency CF3, and the fourth frequency CF4 may be different from each other. The frequency in the lower brightness mode may be higher than the frequency in the higher brightness mode. For example, the first frequency CF1 in the first mode MD1, which is the lowest brightness mode, may be higher than each of the second frequency CF2, the third frequency CF3, and the fourth frequency CF4. For example, the second frequency CF2 in the second mode MD2, which is the highest brightness mode, may be lower than each of the first frequency CF1, the third frequency CF3, and the fourth frequency CF4.

The third frequency CF3 in the third mode MD3, which is the initial setting mode, may be higher than the second frequency CF2 and lower than the fourth frequency CF4. For example, the fourth frequency CF4 in the fourth mode MD4, which is another low brightness mode, may be lower than the first frequency CF1 and higher than the third frequency CF3.

As described above, according to an embodiment, the signal controller TC may output clock signals CLK having mutually different frequencies, based on the operating mode driven in each brightness range. For example, the signal controller TC may include a pulse width modulation (PWM) circuit. For example, the signal controller TC may include a pulse width modulation circuit to modulate a pulse width of each of the clock signals CLK serving as a reference of the light emitting control signal EM, such that the pulse width of the light emitting control signal EM may be controlled.

For example, the signal controller TC may further include a pulse amplitude modulation (PAM) circuit. For example, the signal controller TC may include a pulse amplitude modulation circuit to modulate a pulse amplitude of the clock signals CLK serving as the reference of the light emitting control signal EM. As the pulse width or the pulse amplitude of the clock signals CLK serving as the reference of the light emitting control signal EM is modulated, the width or the amplitude of the driving current may be varied in the light emitting element EE (see FIG. 5) to receive the light emitting control signal EM. Accordingly, the light emitting element EE (see FIG. 5) may emit a light having a brightness varied according to the width or the amplitude of the driving current. For example, as the amplitude of the driving current is increased, the light emitting element EE may emit a light having a higher brightness, and as the pulse width of the driving current is increased, the light emitting element EE may emit a light having a higher brightness. However, the disclosure is not limited thereto.

Unlike the disclosure, in case that the signal controller TC outputs a clock signal having an equal frequency in the lower brightness mode and the higher brightness mode, a grayscale value range, which is expressed (or displayed) in the lower brightness mode, may be narrowed. For example, in the pixel PX (see FIG. 4) including the micro-light emitting diode, a data swing range (DSR), which shows a voltage difference in a grayscale value range from 11 to 255, has a smaller value toward the lower brightness mode. Accordingly, only some grayscale values in the grayscale value range from 0 to 255 may be expressed in the lower brightness mode.

In case that the data swing range is at least about 1.7 V regardless of the operating mode and the frequency, the whole grayscale value range from 0 to 255 may be expressed. Accordingly, since the data swing range in the normal mode showing the maximum brightness of about 600 nits is generally at least about 1.7 V, the whole grayscale value range from 0 to 255 may be expressed. However, in case that the lower brightness mode showing the maximum brightness of about 5 nits is the same as the normal mode in frequency of the clock signal, the data swing range may be at most about 1.7 V (or a maximum of about 1.7 V). In case that the data swing range is at most about 1.7 V (or a maximum of about 1.7 V), only some grayscale values in the grayscale value range from 0 to 255 may be expressed in the lower brightness mode. Accordingly, to express the whole grayscale value range from 0 to 255 even in the lower brightness mode as in the normal mode, the frequency of the clock signal may be increased. The data swing range may be made to be at least about 1.7 V by increasing the frequency of the clock signal. Accordingly, the electronic device ED may express the whole grayscale value range from 0 to 255 even in the lower brightness mode. For example, the display quality of the electronic device ED may be improved.

For example, in case that the signal controller TC overall increases the frequency without distinguishing between the lower brightness mode and the higher brightness mode, the power consumption of the electronic device ED may be increased. Accordingly, according to an embodiment, the signal controller TC may increase the frequency only in the lower brightness mode and may fix the frequency in the higher brightness mode, by distinguishing between the lower brightness mode and the higher brightness mode, thereby reducing the power consumption of the electronic device ED, which is to be increased due to the increase of the frequency.

According to an embodiment, although the lower brightness mode and the higher brightness mode have been described by way of example, the above description does not correspond to only the lower brightness mode and the higher brightness mode. For example, the frequency may be gradually increased in the first mode MD1, the second mode MD2, the third mode MD3, and the fourth mode MD4. For example, the frequency may be increased to be appropriate to each mode to reduce the power consumption of the electronic device ED. For example, in case that the signal controller TC overall increases the frequency without distinguishing among the first mode MD1, the second mode MD2, and the third mode MD3, the power consumption may be about 3.4 mW in each of the first mode MD1, the second mode MD2, and the third mode MD3. However, in case that the signal controller TC overall increases the frequency by distinguishing among the first mode MD1, the second mode MD2, and the third mode MD3, the power consumption in the first mode MD1 may be about 3.4 mW, the power consumption in the second mode MD2 may be about 1.28 mW, and the power consumption in the third mode MD3 may be about 1.93 mW.

Figure 8A:
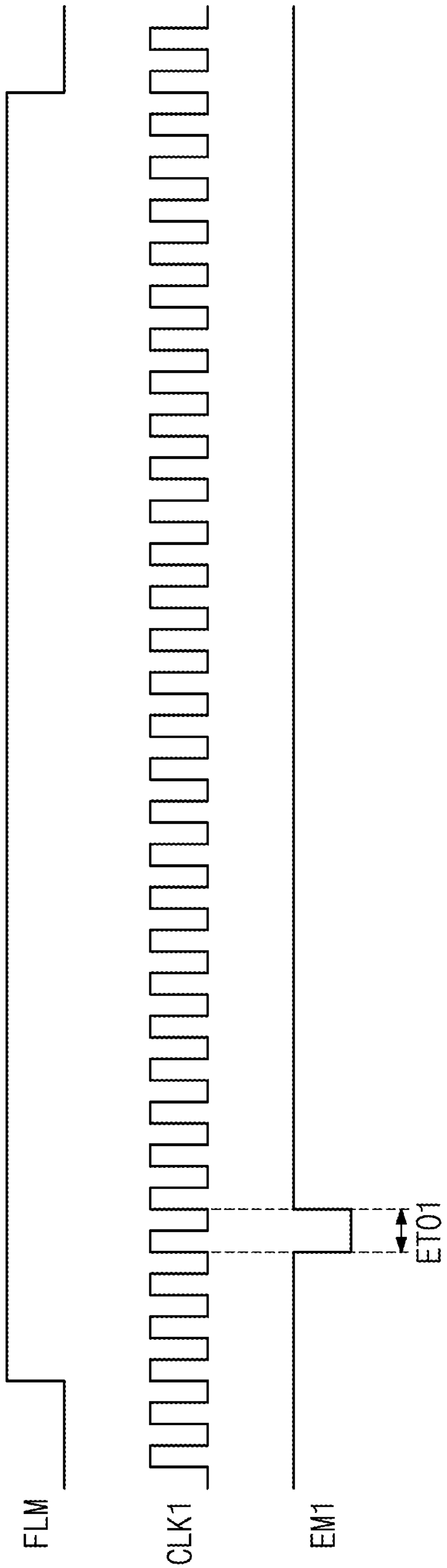
FIG. 8A is a timing diagram illustrating signals in a first mode according to an embodiment.
Figure 8B:
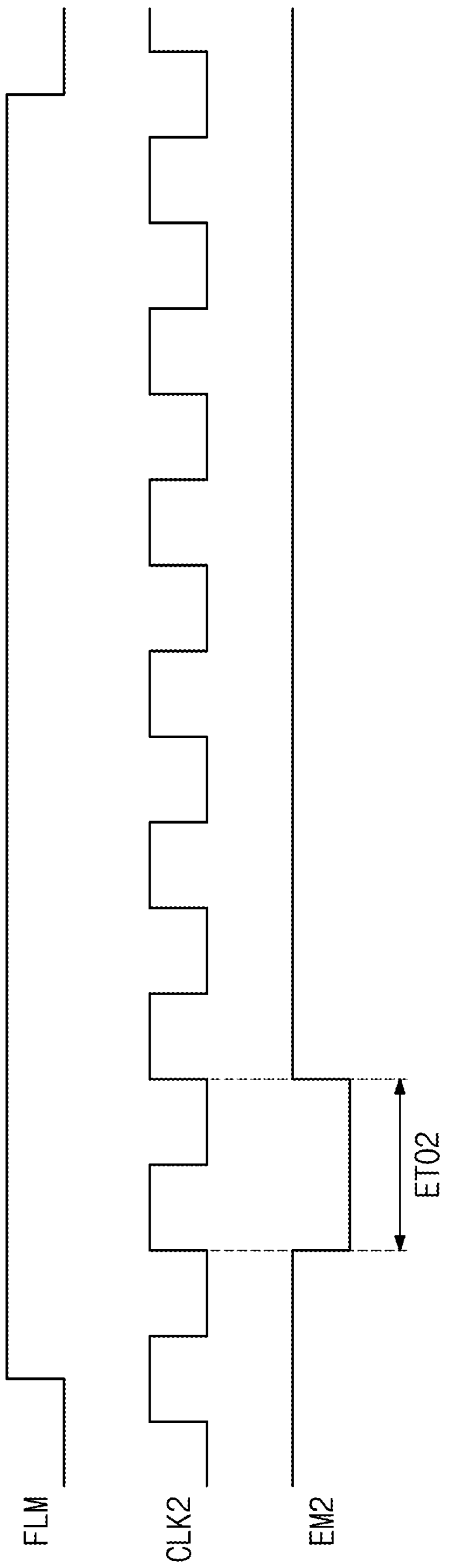
FIG. 8B is a timing diagram illustrating signals in a second mode according to an embodiment.
Figure 8C:
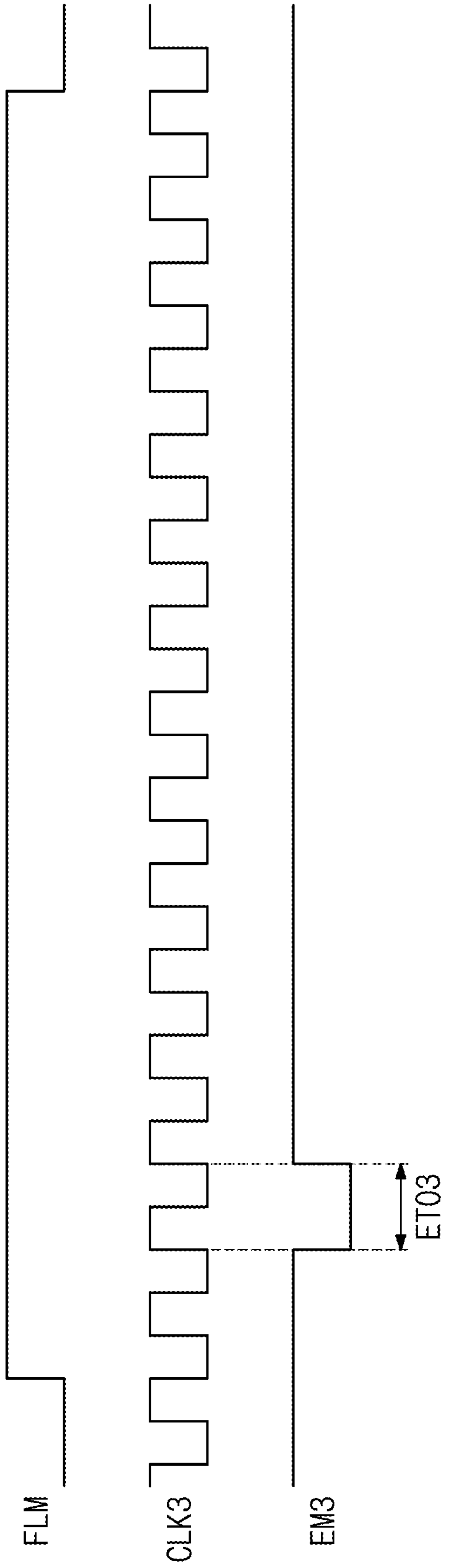
FIG. 8C is a timing diagram illustrating signals in a third mode according to an embodiment.

FIG. 8A is a timing diagram illustrating signals in the first mode MD1 according to an embodiment. FIG. 8B is a timing diagram illustrating signals in the second mode MD2 according to an embodiment. FIG. 8C is a timing diagram illustrating signals in the third mode MD3 according to an embodiment.

Each of the timing diagrams illustrated in FIGS. 8A, 8B, and 8C shows the light emitting control signal EM, which is illustrated in FIG. 6, based on the frame signal FLM and each of the clock signals CLK. The light emitting control signal EM may include a first light emitting control signal EM1, a second light emitting control signal EM2, and a third light emitting control signal EM3.

Referring to FIGS. 5, 6, 7, and 8A, FIG. 8A is a timing diagram illustrating the first light emitting control signal EM1 corresponding to the frame signal FLM and the first clock signal CLK1. The first light emitting control signal EM1 may be a signal output by the light emitting control circuit EDI in the first mode MD1.

According to an embodiment, the first light emitting control signal EM1 may have a first turn-on duration ETO1. The first turn-on duration ETO1 may have a pulse width equal to a period of the first clock signal CLK1. Accordingly, the first light emitting control signal EM1 may turn on the fifth transistor T5 and the sixth transistor T6 of the pixel circuit PXC to correspond to one period of the first clock signal CLK1.

Referring to 8B, FIG. 8B is a timing diagram illustrating the second light emitting control signal EM2 corresponding to the frame signal FLM and the second clock signal CLK2. The second light emitting control signal EM2 may be a signal output by the light emitting control circuit EDI in the second mode MD2.

According to an embodiment, the second light emitting control signal EM2 may have a second turn-on duration ETO2. The second turn-on duration ETO2 may have a pulse width equal to a period of the second clock signal CLK2. Accordingly, the second light emitting control signal EM2 may turn on the fifth transistor T5 and the sixth transistor T6 of the pixel circuit PXC to correspond to one period of the second clock signal CLK2.

Referring to 8C, FIG. 8C is a timing diagram illustrating the third light emitting control signal EM3 corresponding to the frame signal FLM and the third clock signal CLK3. The third light emitting control signal EM3 may be a signal output by the light emitting control circuit EDI in the third mode MD3.

According to an embodiment, the third light emitting control signal EM3 may have a third turn-on duration ETO3. The third turn-on duration ETO3 may have a pulse width equal to a period of the third clock signal CLK3. Accordingly, the third light emitting control signal EM3 may turn on the fifth transistor T5 and the sixth transistor T6 of the pixel circuit PXC to correspond to one period of the third clock signal CLK3.

According to an embodiment, since the first clock signal CLK1, the second clock signal CLK2, and the third clock signal CLK3 are different from each other in period, the first turn-on duration ETO1 of the first light emitting control signal EM1, the second turn-on duration ETO2 of the second light emitting control signal EM2, and the third turn-on duration ETO3 of the third light emitting control signal EM3 may be different from each other in pulse width. For example, the first turn-on duration ETO1 of the first light emitting control signal EM1 may have the narrowest pulse width to correspond to the first clock signal CLK1 having the shortest period. The second turn-on duration ETO2 of the second light emitting control signal EM2 may have the widest pulse width to correspond to the second clock signal CLK2 having the longest period.

According to an embodiment, the first turn-on duration ETO1, the second turn-on duration ETO2, and the third turn-on duration ETO3 may be different from each other in duty ratio. For example, the duty ratio of the second turn-on duration ETO2 may be at least four times the duty ratio of the first turn-on duration ETO1. For example, the duty ratio of the first turn-on duration ETO1 may be about 0.05%, and the duty ratio of the second turn-on duration ETO2 may be about 6.5%. In other words, according to an embodiment, the pulse width of the first turn-on duration ETO1 may be implemented to be narrower than the pulse width of the second turn-on duration ETO2 by at least about 1/100. For example, the pulse width in the lower brightness mode showing the lower maximum brightness may be variously adjusted. Accordingly, the grayscale value range, which is expressed (or displayed), may be widened. For example, the display quality of the electronic device ED may be improved.

According to an embodiment, the duty ratio of the third turn-on duration ETO3 may be greater than the duty ratio of the first turn-on duration ETO1, and the duty ratio of the third turn-on duration ETO3 may be at least twice the duty ratio of the first turn-on duration ETO1. For example, the duty ratio of the third turn-on duration ETO3 may be about 1.36%.

As described above, in case that mutually different frequencies are applied to the modes, the power consumption of the electronic device ED may be reduced, and the grayscale value range, which is expressed (or displayed), may be widened to improve the display quality of the electronic device ED.

Figure 9:
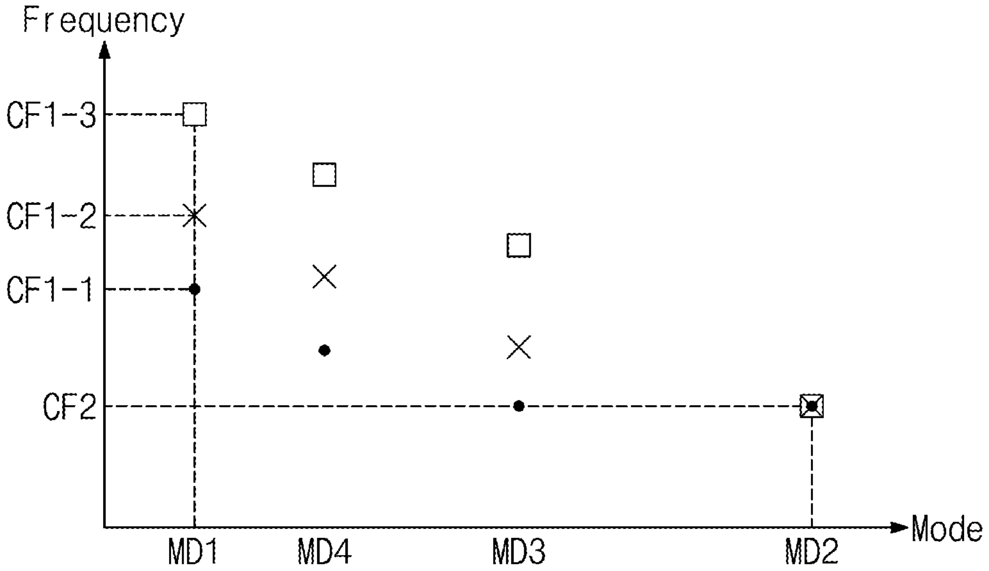
FIG. 9 is a graph illustrating a frequency of each of clock signals according to an embodiment.
Figure 10A:
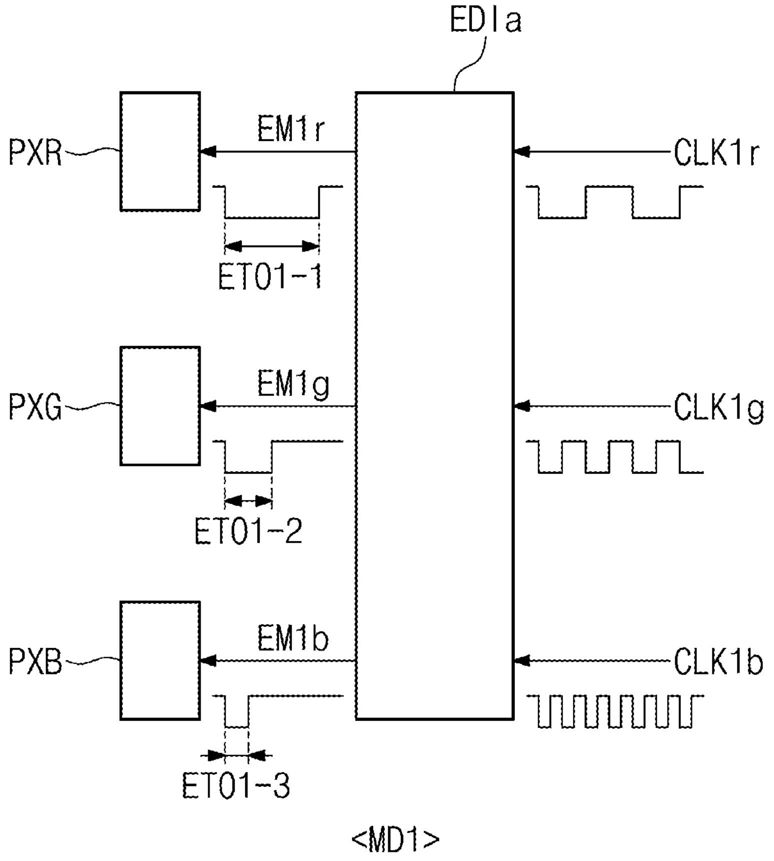
FIG. 10A is a timing diagram illustrating signals for pixels in a first mode according to an embodiment.
Figure 10B:
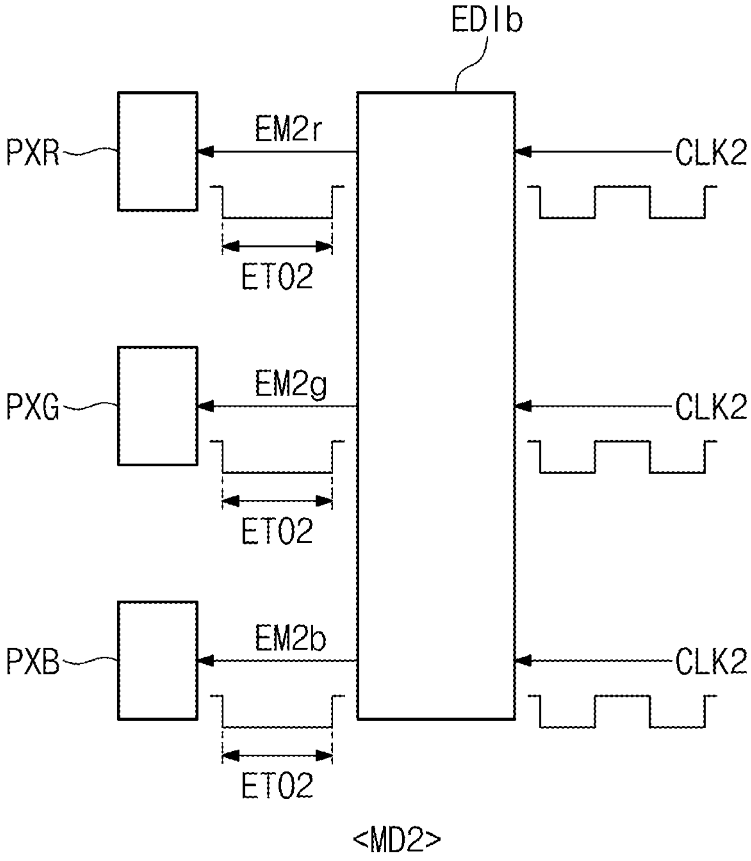
FIG. 10B is a block diagram illustrating signals for pixels in a second mode according to an embodiment.

FIG. 9 is a graph illustrating a frequency of each of clock signals according to an embodiment. FIG. 10A is a timing diagram illustrating signals according to pixels in the first mode MD1 according to an embodiment. FIG. 10B is a timing diagram illustrating signals according to pixels in the second mode MD2 according to an embodiment.

The description about the first mode MD1, the second mode MD2, the third mode MD3, and the fourth mode MD4 illustrated in FIGS. 9, 10A, and 10B, which is the same as the description about those of FIG. 7, will be assigned with the same reference numerals those of FIG. 7, and the details thereof will be omitted.

Referring to FIGS. 4, 9, and 10A, in the first mode MD1, the clock signals CLK (see FIG. 6) may include a first color clock signal CLK1*r*, a second color clock signal CLK1*g*, and a third color clock signal CLK1*b*.

According to an embodiment, the signal controller TC may output the first color clock signal CLK1*r*, the second color clock signal CLK1*g*, and the third color clock signal CLK1*b* to a light emitting control circuit EDIa. The first color clock signal CLK1*r*, the second color clock signal CLK1*g*, and the third color clock signal CLK1*b* received in the light emitting control circuit EDIa may have a (1-1)-th frequency CF1-1, a (1-2)-th frequency CF1-2, and a (1-3)-th frequency CF1-3, respectively. The (1-1)-th frequency CF1-1, the (1-2)-th frequency CF1-2, and the (1-3)-th frequency CF1-3 may be different from each other.

According to an embodiment, the (1-1)-th frequency CF1-1 may be lower than each of the (1-2)-th frequency CF1-2, and the (1-3)-th frequency CF1-3. The (1-2)-th frequency CF1-2 may be higher than the (1-1)-th frequency CF1-1, and lower than the (1-3)-th frequency CF1-3. The (1-3)-th frequency CF1-3 may be higher than each of the (1-1)-th frequency CF1-1 and the (1-2)-th frequency CF1-2.

The light emitting control circuit EDIa may receive the first color clock signal CLK1*r* to output a first color light emitting control signal EM1*r*, to receive the second color clock signal CLK1*g* to output a second color light emitting control signal EM1*g*, and to receive the third color clock signal CLK1*b* to output the third color light emitting control signal EM1*b*.

According to an embodiment, the first color light emitting control signal EM1*r* may have a (1-1)-th turn-on duration ETO11. The (1-1)-th turn-on duration ETO1-1 may have a pulse width equal to a period of the first color clock signal CLK1*r*. Accordingly, the first color light emitting control signal EM1*r* may turn on the fifth transistor T5 and the sixth transistor T6 of the pixel circuit PXC, which is illustrated in FIG. 5, to correspond to one period of the first color clock signal CLK1*r*.

According to an embodiment, the second color light emitting control signal EM1*g* may have a (1-2)-th turn-on duration ETO1-2. The (1-2)-th turn-on duration ETO1-2 may have a pulse width equal to a period of the second color clock signal CLK1*g*. Accordingly, the second color light emitting control signal EM1*g* may turn on the fifth transistor T5 and the sixth transistor T6 of the pixel circuit PXC, which is illustrated in FIG. 5, to correspond to one period of the second color clock signal CLK1*g*.

According to an embodiment, the third color light emitting control signal EM1*b* may have a (1-3)-th turn-on duration ETO1-3. The (1-3)-th turn-on duration ETO1-3 may have a pulse width equal to a period of the third color clock signal CLK1*b*. Accordingly, the third color light emitting control signal EM1*b* may turn on the fifth transistor T5 and the sixth transistor T6 of the pixel circuit PXC, which is illustrated in FIG. 5, to correspond to one period of the third color clock signal CLK1*b*.

According to an embodiment, since the first color clock signal CLK1*r*, the second color clock signal CLK1*g*, and the third color clock signal CLK1*b* are different from each other in period, the (1-1)-th turn-on duration ETO1-1 of the first color light emitting control signal EM1*r*, the (1-2)-th turn-on duration ETO1-2 of the second color light emitting control signal EM1*g*, and the (1-3)-th turn-on duration ETO1-3 of the third color light emitting control signal EM1*b* may be different from each other in pulse width. For example, the (1-3)-th turn-on duration ETO1-3 of the third color light emitting control signal EM1*b* may have the narrowest pulse width to correspond to the third color clock signal CLK1*b* having the shortest period. The (1-1)-th turn-on duration ETO1-1 of the first color light emitting control signal EM1*r* may have the widest pulse width to correspond to the first color clock signal CLK1*r* having the longest period.

The pixels PX may include a red pixel PXR, a green pixel PXG, and a blue pixel PXB. According to an embodiment, the red pixel PXR may receive the first color light emitting control signal EM1*r*, the green pixel PXG may receive the second color light emitting control signal EM1*g*, and the blue pixel PXB may receive the third color light emitting control signal EM1*b*. Accordingly, the red pixel PXR, the green pixel PXG, and the blue pixel PXB may receive light emitting control signals having mutually different frequencies.

The red pixel PXR, the green pixel PXG, and the blue pixel PXB described above may have different data swing range values, which has been described with reference to FIG. 7, due to the difference in required brightness difference and required light emission efficiency. For example, the data swing range of the red pixel PXR may be about 2.1211 V, the data swing range of the green pixel PXG may be about 1.562 V, and the data swing range of the blue pixel PXB may be about 1.2751 V. According to an embodiment, the light emitting control circuit EDIa may output light emitting control signals having mutually different frequencies to the red pixel PXR, the green pixel PXG, and the blue pixel PXB by distinguishing among the red pixel PXR, the green pixel PXG, and the blue pixel PXB, such that the data swing range values may be similar to each other. As described above, as the light emitting control signal is output with a different frequency for each pixel, the power consumption of the electronic device ED may be reduced, and the display quality of the electronic device ED may be improved.

Referring to FIGS. 4, 9, 10A, and 10B, the signal controller TC in the second mode MD2 may output one second clock signal CLK2, which is different from the first mode MD1 of FIG. 10A. The light emitting control circuit EDIb may receive the second clock signal CLK2 to output the first color light emitting control signal EM2*r*, the second color light emitting control signal EM2*g*, and the third color light emitting control signal EM2*b*.

According to an embodiment, each of the first color light emitting control signal EM2*r*, the second color light emitting control signal EM2*g*, and the third color light emitting control signal EM2*b* may be the same as the second light emitting control signal EM2 illustrated in FIG. 8B. Accordingly, the first color light emitting control signal EM2*r*, the second color light emitting control signal EM2*g*, and the third color light emitting control signal EM2*b* may be the same signal.

According to an embodiment, the red pixel PXR may receive the first color light emitting control signal EM2*r*, the green pixel PXG may receive the second color light emitting control signal EM2*g*, and the blue pixel PXB may receive the third color light emitting control signal EM2*b*. However, since the first color light emitting control signal EM2*r*, the second color light emitting control signal EM2*g*, and the third color light emitting control signal EM2*b* illustrated in FIG. 10B are the same signal, the red pixel PXR, the green pixel PXG, and the blue pixel PXB may receive a light emitting control signal having the same pulse width of the turn-on duration, which is different from FIG. 10A.

According to an embodiment, since the second mode MD2 is a normal mode showing the maximum brightness of about 600 nits as described in FIG. 7, the data swing range may be generally at least about 1.7 V, and the whole grayscale value range from 0 to 255 may be expressed. Accordingly, in the second mode MD2, the light emitting control signals having frequencies different according to the pixels need not be output, which is different from the first mode MD1.

As described above, the electronic device may include the display panel driven in one of operating modes having brightness ranges different from each other, and the light emitting control circuit which receives the clock signals having different frequencies according to the operating modes of the display panel, and outputs the light emitting control signal to control transmission of a current provided to the light emitting element.

The signal controller may output clock signals by distinguishing between the lower brightness mode and the higher brightness mode among the operating modes having different brightness ranges. The frequency of the clock signal output in the lower brightness mode may be higher than the frequency of the clock signal output in the higher brightness mode. For example, as the grayscale value range, which is expressed (or displayed) in the lower brightness mode, is widened, the display quality of the electronic device may be improved. For example, as the frequency of the clock signal is selectively increased, the power consumption of the electronic device may be reduced.

Although an embodiment has been described for illustrative purposes, those skilled in the art will appreciate that various modifications, and substitutions are possible, without departing from the scope and spirit of the disclosure as disclosed in the accompanying claims. Accordingly, the technical scope of the disclosure is not limited to the detailed description of this specification, but should be defined by the claims.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. An electronic device comprising: a display panel that displays an image and including a pixel including a light emitting element and a pixel circuit electrically connected to the light emitting element; a signal controller that determines an operating mode of the display panel, and outputs a plurality of clock signals; and a light emitting control circuit that receives the plurality of clock signals and outputs a light emitting control signal having a turn-on duration for controlling transmission of a current provided to the light emitting element, wherein the operating mode includes a first mode driven in a first brightness range and a second mode driven in a second brightness range wider than the first brightness range, wherein the plurality of clock signals include a first clock signal having a first frequency and a second clock signal having a second frequency lower than the first frequency, wherein the signal controller is configured to output the first clock signal in the first mode, and the light emitting control circuit is configured to output a first light emitting control signal having a first turn-on duration in the first mode, wherein the signal controller is configured to output the second clock signal in the second mode, and the light emitting control circuit is configured to output a second light emitting control signal having a second turn-on duration in the second mode, and wherein a pulse width of the first turn-on duration is equal to a period of the first clock signal, and a pulse width of the second turn-on duration is equal to a period of the second clock signal.

2. The electronic device of claim 1, wherein a maximum brightness of the second brightness range is at least 100 times of a maximum brightness of the first brightness range.

3. The electronic device of claim 2, wherein the maximum brightness of the first brightness range is about 5 nits, and the maximum brightness of the second brightness range is about 600 nits.

4. The electronic device of claim 2, wherein a duty ratio of the second turn-on duration is at least four times a duty ratio of the first turn-on duration.

5. The electronic device of claim 2, wherein the plurality of clock signals include a first color clock signal having a first color frequency, a second color clock signal having a second color frequency, and a third color clock signal having a third color frequency, wherein the first color frequency, the second color frequency, and the third color frequency are different from each other, wherein the signal controller is configured to output the first color clock signal, the second color clock signal, and the third color clock signal, in the first mode, and wherein the second color frequency is higher than the first color frequency, and the third color frequency is higher than the second color frequency.

6. The electronic device of claim 5, wherein the light emitting control circuit is configured to output a first color light emitting control signal by receiving the first color clock signal, output a second color light emitting control signal by receiving the second color clock signal, and output a third color light emitting control signal by receiving the third color clock signal.

7. The electronic device of claim 6, wherein the pixel is provided in plurality, and the plurality of pixels include a red pixel, a green pixel, and a blue pixel, and wherein the red pixel receives the first color light emitting control signal, the green pixel receives the second color light emitting control signal, and the blue pixel receives the third color light emitting control signal.

8. The electronic device of claim 7, wherein the first color light emitting control signal, the second color light emitting control signal, and the third color light emitting control signal are substantially equal to each other, in the second mode.

9. The electronic device of claim 1, wherein the signal controller further outputs a third clock signal having a third frequency between the first frequency and the second frequency, wherein the operating mode further includes a third mode driven in a third brightness range, and wherein the signal controller is configured to output the third clock signal in the third mode, and the light emitting control circuit is configured to output a third light emitting control signal having a third turn-on duration.

10. The electronic device of claim 9, wherein a maximum brightness of the first brightness range is about 5 nits, a maximum brightness of the second brightness range is about 600 nits, and a maximum brightness of the third brightness range is about 126 nits.

11. The electronic device of claim 10, wherein a duty ratio of the third turn-on duration is greater than a duty ratio of the first turn-on duration.

12. The electronic device of claim 1, wherein the first mode is an Always on display (AOD) mode.

13. The electronic device of claim 1, wherein the light emitting element is a micro-light emitting diode.

14. The electronic device of claim 1, further comprising:

a housing accommodating the display panel including in the housing and a strap coupled to the housing.

15. An electronic device comprising:

a display panel including a pixel including a light emitting element;

a signal controller that selectively drives the display panel in a first mode or a second mode different from the first mode, and outputs a first clock signal having a first frequency and a second clock signal having a second frequency lower than the first frequency;

a light emitting stage that receives one of the first clock signal or the second clock signal, and outputs a light emitting control signal having a turn-on duration for controlling transmission of a current provided to the light emitting element;

a housing accommodating the display panel included in the housing; and a strap coupled to the housing, wherein the signal controller outputs the first clock signal in the first mode, and the light emitting stage outputs a first light emitting control signal having a first turn-on duration, wherein the signal controller outputs the second clock signal in the second mode, and the light emitting stage outputs a second light emitting control signal having a second turn-on duration, and wherein the first turn-on duration has a pulse width equal to a period of the first clock signal, and the second turn-on duration has a pulse width equal to a period of the second clock signal.

16. The electronic device of claim 15, wherein the first mode is driven in a first brightness range and the second mode is driven in a second brightness range wider than the first brightness range, and a maximum brightness of the second brightness range is at least 100 times of a maximum brightness of the first brightness range, and a duty ratio of the second turn-on duration is at least four times a duty ratio of the first turn-on duration.

17. The electronic device of claim 16, wherein a plurality of clock signals include a first color clock signal having a first color frequency, a second color clock signal having a second color frequency, and a third color clock signal having a third color frequency, wherein the first color frequency, the second color frequency, and the third color frequency are different from each other, wherein the signal controller is configured to output the first color clock signal, the second color clock signal, and the third color clock signal, in the first mode and wherein the second color frequency is higher than the first color frequency, and the third color frequency is higher than the second color frequency.

18. The electronic device of claim 17, wherein the pixel includes a plurality of pixels, and the plurality of pixels include a red pixel, a green pixel, and a blue pixel, and wherein the light emitting stage is configured to output a first color light emitting control signal to the red pixel by receiving the first color clock signal, output a second color light emitting control signal to the green pixel by receiving the second color clock signal, and output a third color light emitting control signal to the blue pixel by receiving the third color clock signal.

19. The electronic device of claim 18, wherein the first color light emitting control signal, the second color light emitting control signal, and the third color light emitting control signal are substantially equal to each other, in the second mode.

20. The electronic device of claim 15, wherein the light emitting element is a micro-light emitting diode.

* * * * *